ип
United States Patent
Edmunds et al.

(10) Patent No.: US 8,052,590 B2
(45) Date of Patent: Nov. 8, 2011

(54) AMORPHOUS METAL COMPONENTS FOR A REPRODUCTION MACHINE

(75) Inventors: Cyril G. Edmunds, Webster, NY (US); Stephen L. Gaudioso, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1790 days.

(21) Appl. No.: 11/176,600

(22) Filed: Jul. 7, 2005

(65) Prior Publication Data

US 2007/0009749 A1   Jan. 11, 2007

(51) Int. Cl.
*F16C 13/00* (2006.01)

(52) U.S. Cl. ............... 492/54; 492/53; 492/49; 399/333

(58) Field of Classification Search ................. 492/49, 492/53, 54, 56; 399/333
See application file for complete search history.

(56) References Cited

U.S. PATENT DOCUMENTS

| 4,309,803 | A | * | 1/1982 | Blaszak | 492/53 |
| 4,755,400 | A | | 7/1988 | Dempsey et al. | |
| 4,970,560 | A | | 11/1990 | Lindblad et al. | |
| 5,038,178 | A | * | 8/1991 | Hosoya et al. | 399/313 |
| 5,094,911 | A | * | 3/1992 | Barbezat et al. | 428/336 |
| 5,217,532 | A | * | 6/1993 | Sasame et al. | 118/60 |
| 5,288,344 | A | | 2/1994 | Peker et al. | |
| 5,336,539 | A | * | 8/1994 | Fitzgerald | 428/36.8 |
| 5,441,838 | A | | 8/1995 | Pane | |
| 5,452,061 | A | * | 9/1995 | Kojima et al. | 399/171 |
| 5,474,850 | A | | 12/1995 | DelRosario et al. | |
| 5,480,724 | A | * | 1/1996 | Fitzgerald et al. | 428/447 |
| 5,633,793 | A | | 5/1997 | Takenouchi et al. | |
| 5,678,154 | A | | 10/1997 | Chen et al. | |
| 5,772,803 | A | | 6/1998 | Peker et al. | |
| 5,807,631 | A | | 9/1998 | Moser | |
| 5,897,248 | A | * | 4/1999 | Schlueter et al. | 399/313 |
| 6,055,404 | A | | 4/2000 | Yamazaki et al. | |
| 6,115,575 | A | * | 9/2000 | Kinoshita et al. | 399/286 |
| 6,137,986 | A | * | 10/2000 | Sugino et al. | 399/333 |
| 6,224,978 | B1 | * | 5/2001 | Chen et al. | 428/376 |
| 6,314,268 | B1 | | 11/2001 | Giunta et al. | |
| 6,393,247 | B1 | * | 5/2002 | Chen et al. | 399/330 |
| 6,393,249 | B1 | * | 5/2002 | Aslam et al. | 399/333 |
| 6,405,013 | B2 | * | 6/2002 | Haneda et al. | 399/330 |
| 6,490,430 | B1 | * | 12/2002 | Chen et al. | 399/333 |
| 6,567,641 | B1 | * | 5/2003 | Aslam et al. | 399/330 |
| 6,799,003 | B2 | * | 9/2004 | Kishimoto et al. | 399/69 |
| 6,819,886 | B2 | | 11/2004 | Runkowske et al. | |
| 6,838,140 | B1 | | 1/2005 | Heeks et al. | |
| 6,879,333 | B2 | * | 4/2005 | Furuyama | 347/208 |
| 7,292,815 | B2 | * | 11/2007 | Beach et al. | 399/330 |
| 7,433,642 | B2 | * | 10/2008 | Higashi et al. | 399/333 |
| 2003/0062146 | A1 | * | 4/2003 | Strezov | 164/480 |
| 2004/0066522 | A1 | | 4/2004 | Tamaguchi et al. | |
| 2004/0136763 | A1 | * | 7/2004 | Murakami et al. | 399/350 |
| 2005/0002705 | A1 | | 1/2005 | Shintani et al. | |
| 2005/0113230 | A1 | * | 5/2005 | Hirasawa et al. | 492/53 |
| 2006/0216085 | A1 | * | 9/2006 | Murakami et al. | 399/350 |
| 2006/0285894 | A1 | * | 12/2006 | Beach et al. | 399/333 |
| 2006/0285896 | A1 | * | 12/2006 | Beach et al. | 399/333 |
| 2009/0214271 | A1 | * | 8/2009 | Yamada et al. | 399/284 |
| 2010/0032308 | A1 | * | 2/2010 | Qi et al. | 205/164 |

FOREIGN PATENT DOCUMENTS

| JP | 01314800 | A | * | 12/1989 |
| JP | 04182657 | A | * | 6/1992 |
| JP | 07140823 | A | * | 6/1995 |
| JP | 07258848 | A | * | 10/1995 |
| JP | 11272104 | A | * | 10/1999 |
| JP | 11305519 | A | * | 11/1999 |
| KR | 2003083063 | A | * | 10/2003 |

OTHER PUBLICATIONS

Liquidmetal® Technologies, http://www.liquidmtal.com/technology/, retrieved on Feb. 17, 2005, 3 pages.
"Metallic Glasses Bulk Up," Mechanical Engineering, http://www.memagazine.org/backissues/june98/features/metallic/metallic.html, retrieved on Apr. 23, 2005, 6 pages.
"Quick Reference Activity Guide: Amorphous Metal," 7 pages.

* cited by examiner

*Primary Examiner* — Essama Omgba

(74) *Attorney, Agent, or Firm* — Maginot, Moore & Beck LLP

(57) ABSTRACT

In one embodiment, a fuser roll for fusing toner images onto a substrate includes a substantially rigid core member, a deformable, heat conductive base layer overlaying the surface of said core member, and an outer layer supported on the base layer. The outer layer is formed of a heat conductive, conformable amorphous metal.

5 Claims, No Drawings

AMORPHOUS METAL COMPONENTS FOR A REPRODUCTION MACHINE

TECHNICAL BACKGROUND

The present disclosure relates generally to components for reproduction and reprographic machines, such as copiers, printers, facsimile machines, bookmaking machines and any apparatus which performs a print outputting function. More particularly, the disclosure concerns improvements that extend the wear or fatigue life of certain components of these types of machines.

In one type of toner image reproduction machine, for example an electrostatic printing process machine, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas to record an electrostatic latent image on the photoconductive member corresponding to the informational areas contained within the original document.

At the imaging station, a document handling unit is positioned over a platen of the printing machine. The document handling unit sequentially feeds documents from a stack of documents to be copied. After imaging, the original document is returned to a document tray or through a duplex path.

After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

The foregoing generally describes a typical black and white electrostatic printing machine. With the advent of multicolor electrophotography, it is desirable to use an architecture which comprises a plurality of image forming stations. One example of the plural image forming station architecture utilizes an image-on-image (IOI) system in which the photoreceptive member is recharged, re-imaged and developed for each color separation. This charging, imaging, developing and recharging, re-imaging and developing, all followed by transfer to paper, is done in a single revolution of the photoreceptor in so-called single pass machines, while multi-pass architectures form each color separation with a single charge, image and develop, with separate transfer operations for each color.

In either case, the toner image ordinarily is transferred unfused onto a copy sheet of paper, which is then picked up by a transport mechanism (a prefuser transport) for delivery to a fuser assembly where the toner is heated and fused to make a finished copy. Conventional pre-fuser transport mechanisms typically use rotating belts stretched between a drive shaft and an idler shaft with perforations in the belts that allow vacuum pressure from a blower to be drawn through holes in a plate below the belts, and through the belts to the sheet. The vacuum pressure assists each sheet of paper that has an image on it via electrically charged toner particles, to be pulled off the photoreceptor and acquired on the pre-fuser transport, without disturbing the unfused image on the sheet, especially in the transfer zone.

A conveyer then typically advances the copy sheet to a fusing station that includes a fuser assembly which permanently affixes the transferred toner powder image to the copy sheet. The fuser assembly often includes a heated fuser roller and a pressure roller with the powder image on the copy sheet contacting the fuser roller. The fuser roller may be internally heated by a quartz lamp. Release agent, stored in a reservoir, is pumped to a metering roll. A trim blade trims off the excess release agent. The release agent transfers to a donor roll and then to the fuser roll. The release agent helps release the copy paper from the fuser roll after the image has been fused.

After fusing, the copy sheets may be fed through a decurler that bends the copy sheet in such a way that the sheet curl produced during the fusing operation is substantially reduced. The sheet is then advanced to a duplex solenoid gate that guides the sheet to a finishing station or to a duplex tray. The duplex tray provides an intermediate storage for those sheets that have been printed on one side and on which an image will be subsequently printed on the second, opposed side thereof—i.e., the sheets being duplexed. In order to complete duplex copying, the simplex sheets in tray are fed back to the transfer station for transfer of the toner powder image to the opposed sides of the copy sheets. The duplex sheet is then fed through the same path as the simplex sheet to be advanced to the finishing station. Copy sheets are fed to the transfer station from a high speed feeder tray as well as from secondary trays. In many machines, a vacuum feed belt feeds successive uppermost sheets from the trays to the transfer station.

Further details of this typical reproduction machine can be garnered from U.S. Pat. No. 6,314,268, which issued to the assignee of the present application on Nov. 6, 2001, the disclosure of which is incorporated herein by reference, particularly the disclosure related to FIG. 1 of that patent.

In many reproduction machines, a photoreceptor cleaning apparatus is provided to remove residual image forming toner from the surface of the photoreceptor. A typical cleaning apparatus includes a flexible element that rides on the photoreceptor surface as the surface passes by the element. The flexible element may be a brush or a blade, such as the blade disclosed in U.S. Pat. No. 4,970,560, which issued to the assignee of the present application on Nov. 13, 1990, the disclosure of which is incorporated herein by reference.

In most reproduction machines, the fusing station is the critical element that fixes the reproduced image on the transfer or copy sheet. Most fusing stations include the heated fuser roll and the pressure roller described above. Roll-type fusers fall into two general categories: low gloss, typically found in black and white reproduction engines; and high gloss, typically used in color engines. Low gloss fusers produce images with a limited dynamic range, while high gloss fusers can usually achieve a dynamic range of 75-90 to give the reproduced image "depth". Dynamic range is especially important for color reproduction, where the emphasis is often on creating photographic quality prints.

High gloss reproduction is complicated by consumer desire for high copy rates. With higher sheet feed and copy rates, the sheet or substrate necessarily spends less time at any one station of the reproduction machine, including the fusing station where the toner image is fixed on the sheet. This reduced processing time frequently leads to non-uniform gloss on the sheet, which is an undesirable phenomenon. In order to maintain as uniform a gloss as possible, the fuser roll must conform to the surface of the substrate or sheet. Low spots on the sheet make poor contact with the fuser roll and therefore acquire little gloss.

On the other hand, a fuser material that is soft enough to conform to the substrate surface is susceptible to high wear rates. To provide a "soft" roll with a harder wear resistant characteristic, many color fusers overcoat a silicone layer with a thin VITON™ rubber layer. This material is a fluoroelastomer produced by E.I. du Pont de Nemours & Co. One example of a fuser roll of this design is disclosed in U.S. Pat. No. 5,807,631 (the '631 Patent), which issued to the assignee of the present application on Sep. 16, 1998. The entire disclosure of this patent is incorporated herein by reference. In particular, them '631 Patent discloses a multi-layered nip forming fuser roll (NFFR) in which the heated roll includes a substantially rigid core member having a radiant quartz heater disposed therein. The heating element radiates heat to the cylinder which is conducted to the outer layers of the roll. The first layer of the roll is a heat conductive silicone rubber layer. This layer is followed by two layers of VITON™, in which the innermost layer is thermally conductive and the outer layer is relatively non-conductive. The relatively conductive layers (i.e., the silicone and innermost VITON™ layers) are rendered conductive by the use of appropriate metallic and/or non-metallic fillers. The fillers are integrated into the layers in a manner that does not disturb the deformability or "softness" of the layers.

Since VITON™ is much harder than the underlying silicone, the addition of the VITON™ material helps extend the life of the fuser roll. However, the VITON™ material is typically more expensive than traditional coating materials used in reproduction machines. Moreover, use of the VITON™ material can make color fusers much more expensive to operate than the typical low gloss black and white fuser. There is consequently a need for a fuser roll construction that is capable of achieving high gloss reproduction at a cost that approximates the low gloss engines.

Wear and expense are also critical concerns for other high frequency service components of a high speed reproduction or printing machine. As described in the '631 Patent, the fuser roll includes a release agent management (RAM) system that applies a release agent to the surface of the fuser roll to prevent adherence of the substrate to the fuser roll. The RAM system disclosed in the '631 Patent utilizes a wiper blade formed of VITON™ to create a uniform layer of the release agent on a metering roll. Like the fuser roll, the wiper blade wears over time and must be replaced. Similar cleaning blades are used to clean the photoreceptor and certain feed rolls. The feed rolls themselves are also high frequency service components in a typical reproduction machine.

There is a continuing need to improve the life of the typical service components of reproduction machines, especially high speed machines. In addressing this need, it is also important to reduce the overall acquisition and operating costs of the machine.

SUMMARY

In order to address these needs, amorphous metal coatings are provided on high frequency service components, and particularly on components having an underlying or base layer of a conformable or elastomeric material, such as the heated fuser roll of the reproduction machine. Thus, in one embodiment, a fuser roll for fusing toner images onto a substrate comprises a substantially rigid core member, a deformable heat conductive base layer overlaying the surface of the core member, and an outer layer supported on the base layer. The outer layer is formed of a heat conductive, conformable amorphous metal. In one specific embodiment, the amorphous metal is a titanium or zirconium based alloy having a thermal conductivity of between about 0.25 to about 0.40 w/m° C.

In certain embodiments, the amorphous metal is applied at a substantially uniform thickness across substantially the entire surface of the underlying or base layer. In other embodiments, the amorphous metal is applied in a pre-determined pattern, most particularly to improve the wear or abrasion resistance of the high frequency service item.

In another embodiment, a component for contact with a substrate passing through a reproduction or printing machine comprises a substantially rigid core member having an outer surface configured for substantially uniform contact with the substrate passing through the machine, a deformable base layer overlaying the outer surface of the core member, and an outer layer supported on the base layer, wherein the outer layer is formed of an amorphous metal. In certain embodiments, the base layer is an elastomeric material.

One benefit of the embodiments disclosed herein is that the novel amorphous metal coating improves the wear or abrasion resistance of a high frequency service item that is inherently resilient. Another benefit is that the disclosed coating reduces the overall cost to operate a reproduction machine, such as a high-speed, electrostatic color reproduction machine.

DESCRIPTION OF THE EMBODIMENTS

In accordance with one embodiment, a fuser roll, such as the heated fuser roll disclosed in the '631 Patent, includes an outermost layer formed of an amorphous metal. The fuser roll of this embodiment retains the innermost base layer of a soft elastomeric material, such as the silicone layer disclosed in the '631 Patent. This elastomeric layer may be over-coated with the amorphous metal in lieu of the VITON™ layers disclosed in the '631 Patent. The remainder of the fuser roll may be constructed as disclosed in the '631 Patent, incorporated previously by reference. In particular, the fuser roll may include a substantially rigid core member that houses a heating element within a hollow interior. The fuser roll is often cylindrical for use in combination with a cylindrical pressure roll.

The amorphous metal layer may be applied to the surface of the elastomeric layer of the fuser roll in any known manner, including but not limited to, casting, thermal spraying, plasma deposition, chemical vapor deposition, vacuum deposition, ion sputtering, electrochemical deposition and chemical solution plating. Application of the amorphous metal layer to the underlying substrate may be augmented by known means to enhance the adhesion of the amorphous metal coating on the substrate, including but not limited to substrate ion etching, providing an intermediate adhesive layer and mechanical surface treatment of the underlying substrate.

One method for applying the amorphous metal layer to the underlying elastomeric substrate will mechanically or chemically integrate the amorphous metal into the top layer of the substrate so that the two layers do not separate during use. Thus, in one embodiment, the underlying elastomeric layer may be provided with a pattern of grooves across the entire cylindrical surface of the layer. When the amorphous metal layer is applied to the elastomeric layer, the amorphous metal fills the grooves to mechanically integrate with the elastomeric layer. In accordance with this method, the amorphous metal is applied by thermal spraying.

In a reproduction machine, the heated roll incorporates the amorphous metal layer, while the pressure roll may be unaltered. The typical pressure roll includes a pressure surface that is harder than the mating surface of the heated fuser roll. Alternatively, the pressure roll may include an amorphous metal layer over the harder underlying roll surface. In this case, the amorphous metal layer is provided primarily for wear and abrasion resistance, rather than for any conformability properties.

The amorphous metal is selected to be highly conformable to the surface of the sheet or substrate passing through the fusing station and in pressure contact with the heated fuser roll. The amorphous metal also has thermal conductivity properties sufficient to conduct heat from the elastomeric layer to the sheet or substrate passing through the fusing station. In a specific embodiment, the amorphous metal layer has a thermal conductivity of 0.25 to 0.40 W/m° C.

One suitable class of amorphous metals is produced by LiquidMetal Technologies under the name LIQUIDMETAL®. One specific amorphous metal alloy is sold under the tradename ARMACOR™ for use as an industrial coating. This composition is believed to have sufficient bond strength without the need for a bonding layer. The material is also believed to be able to withstand thermal cycling and to exhibit excellent thermal conductivity. This particular material is preferably applied to the underlying substrate by twin wire arc spraying techniques.

Another suitable class of amorphous metals includes Zirconium based alloys, such as alloys provided under the tradename VITRELOY. These amorphous metal alloys are composed of (in atomic weigh percentages) 45-67% Zirconium (Zr) and Titanium (Ti), 10-38% Nickel (Ni) and Copper (Cu) and 10-35% Berrylium (Be). One specific alloy is composed of about 65% Zr, 20% Be and 15% Cu, Ti and Ni. These alloys exhibit superior elastic properties and wear resistance. Other suitable amorphous metals are disclosed in U.S. Pat. No. 5,288,344, issued on Feb. 22, 1994, the disclosure of which is incorporated herein by reference.

In the embodiment of a fuser roll, the underlying layer of elastomeric material (such as silicone) has a thickness of about 1.0-3.0 mm. The thickness of the amorphous metal layer may be as low as 0.1 mm and still retain the beneficial properties of the material. These properties include wear/abrasion resistance, conformability, heat cycling resistance and thermal conductivity. The conformability property of the amorphous metal is particularly suited for use on the fuser roll described above because that the amorphous metal layer can deform to match the surface of the copy sheet. The layer deforms without fatigue over the useful life of the fuser roll. In one specific embodiment, the amorphous metal layer has a thickness of about 0.2 mm.

In the above described embodiment, the amorphous metal is applied uniformly over the surface of the underlying elastomeric substrate of the fuser roll. In other embodiments, the amorphous metal may be applied in a predetermined pattern to an underlying substrate. For instance, as described above, a release agent is typically applied to the fuser roll to facilitate release of the copy sheet after the image is fused. The release agent may be applied by a flexible wiper blade. In accordance with one embodiment, the wiper blade includes a pattern of amorphous metal applied to an underlying elastomeric blade. In this embodiment, the amorphous metal provides wear resistance for the wiper blade so the metal may be applied as a series of wear strips, or as a plurality of discrete dots on the working surface of the wiper blade.

The same amorphous metal pattern may be applied to a wiper blade used to clean the photoreceptor. With this embodiment, the amorphous metal may be impregnated with a lubricity agent, such as TEFLON® to reduce the sliding friction between the amorphous metal layer and the surface of the photoreceptor. The wiper blade in most printing and copier machines is conformable so that the blade may conform closely to the surface of the photoreceptor to optimize the cleaning effect of the blade. Thus, the amorphous metal coating is beneficial in this application because of the ability of this material to adapt to the conformability of the underlying wiper blade material. The underlying wiper blade may formed from a variety of known elastomeric materials, such as silicone or urethane rubber.

The beneficial properties of the above-described amorphous metal may be applied to other high frequency service components of the typical printing or reproduction machine. For instance, sheet feed and transfer is often accomplished with a nip roll. The surface of a rubber or elastomeric roll may be coated with the amorphous metal described above, either as a uniform layer or in a pattern especially adapted for wear resistance and conformability.

In each of the embodiments, the amorphous metal layer preferably presents a smooth surface. This attribute is especially important for the fuser roll construction since it is desirable to provide a smooth uniform surface in contact with the copy sheet or substrate. Depending upon the manner in which the amorphous metal layer is applied, the layer may require mechanical or chemical polishing to achieve an appropriate surface finish. In some embodiments, the surface finish of the amorphous metal layer is less critical, such as the wiper brush incorporated into a release agent application system.

It is generally known that in copier or printer components, the surfaces of certain deformable or elastomeric components distort considerably at the point of contact with the engaging member. This distortion changes the wear mechanism from one of abrasion to one of stress/strain fatigue and breakdown of the chemical bonds holding the elastomer together. The use of an anti-abrasive, low-friction coating generally does not address this type of wear. However, the use of the amorphous metal coatings described herein will account for this wear mechanism because the amorphous metal coating can distort with the underlying substrate without compromising the integrity of the coating.

The relatively high (functionally required) deformation of the high frequency service components of a copier or printing machine can pose a problem to the application of any antiabrasive coating material. However, the amorphous metal coatings described herein may be applied by bonding the amorphous metal coating to the underlying surface via plasma deposition or other chemical means. This bond increases the likelihood that the amorphous metal coating will stay attached and will reduce the incidence of microcracking of the underlying substrate (which frequently leads to component failure). Even where the amorphous metal is deposited in a non-contiguous pattern, as described above, micro-cracking of the substrate is still controlled because any developing micro-cracks get broken up by 'islands' of amorphous metal bonded to the surface of the substrate. Thus, even where the amorphous metal is not applied as a continuous, contiguous surface, the metal layer still prevents large tears from occurring in the elastomer surface of the component.

It will be appreciated that various of the above disclosed features and functions, or alternatives thereof, may be desirably combined into many other different systems or applications. Various presently unforeseen or unanticipated alternatives, modifications, variations or improvements may be subsequently made by those skilled in the art which are also intended to be encompassed by the following claims.

What is claimed is:

1. A fuser roll for fusing toner images onto a substrate, said fuser roll comprising:
   a substantially rigid core member;
   a heating element for heating said core member;
   a deformable, heat conductive base layer overlaying the surface of said core member; and
   an outermost layer supported on said base layer, said outermost layer formed of a heat conductive, conformable amorphous metal wherein said amorphous metal is a titanium or zirconium based alloy.

2. The fuser roll of claim 1, wherein said outermost layer has a thermal conductivity of between about 0.25 to about 0.40 w/m° C.

3. The fuser roll of claim 1, wherein said outermost layer has a substantially uniform thickness across substantially the entire surface of said base layer and further wherein said thickness is sufficient for said outermost layer to deform substantially uniformly with said base layer when surface pressure is applied thereto.

4. The fuser roll of claim 3, wherein said outermost layer has a thickness of between about 0.1 mm and 0.2 mm.

5. The fuser roll of claim 1, wherein:
   said base layer defines a pattern of grooves on the outer surface of said base layer; and
   said outermost layer includes a portion integrated into said pattern of grooves.

* * * * *